United States Patent
Robbins (10) Patent No.: US 8,363,812 B1
(45) Date of Patent: Jan. 29, 2013

(54) METHOD AND SYSTEM FOR PROVIDING CALL PARKING IN A SIP-BASED NETWORK

(75) Inventor: David C Robbins, Grafton, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1313 days.

(21) Appl. No.: 11/534,286

(22) Filed: Sep. 22, 2006

Related U.S. Application Data (60) Provisional application No. 60/719,465, filed on Sep. 22, 2005.

(51) Int. Cl.
*H04M 3/42* (2006.01)

(52) U.S. Cl. .............. 379/211.01; 379/211.02

(58) Field of Classification Search .......... 379/211.01, 379/211.02, 212.01, 215.01, 207; 370/356
See application file for complete search history.

(56) References Cited

U.S. PATENT DOCUMENTS

| | | | |
|---|---|---|---|
| 3,737,587 A * | 6/1973 | Romero ................. 379/214.01 |
| 4,154,987 A | 5/1979 | Rosenberg et al. |
| 4,528,424 A | 7/1985 | Middleton et al. |
| 4,723,271 A | 2/1988 | Grundtisch |
| 4,741,024 A | 4/1988 | Del Monte et al. |
| 4,950,011 A * | 8/1990 | Borcea et al. ................ 294/2 |
| 5,165,095 A | 11/1992 | Borcherding |
| 5,323,444 A | 6/1994 | Ertz et al. |
| 5,471,519 A | 11/1995 | Howe et al. |
| 5,619,561 A | 4/1997 | Reese |
| 5,815,550 A | 9/1998 | Miller |
| 5,835,570 A | 11/1998 | Wattenbarger |
| 5,913,166 A * | 6/1999 | Buttitta et al. ............... 455/436 |
| 5,970,134 A * | 10/1999 | Highland et al. ........ 379/265.02 |
| 5,999,610 A | 12/1999 | Lin et al. |
| 6,021,176 A | 2/2000 | McKendry et al. |
| 6,026,156 A * | 2/2000 | Epler et al. ............... 379/215.01 |
| 6,031,896 A | 2/2000 | Gardell et al. |
| 6,072,865 A | 6/2000 | Haber et al. |
| 6,208,726 B1 | 3/2001 | Bansal et al. |
| 6,219,414 B1 | 4/2001 | Maciejewski et al. |
| 6,308,726 B2 | 10/2001 | Bansal et al. |
| 6,337,898 B1 | 1/2002 | Gordon |
| 6,339,639 B1 | 1/2002 | Henderson |
| 6,404,876 B1 | 6/2002 | Smith et al. |
| 6,484,196 B1 | 11/2002 | Maurille |
| 6,510,315 B1 | 1/2003 | Arnson |
| 6,636,594 B1 | 10/2003 | Oran |
| 6,735,295 B1 | 5/2004 | Brennan et al. |
| 6,741,695 B1 | 5/2004 | McConnell et al. |
| 6,744,877 B1 * | 6/2004 | Edwards ................. 379/265.02 |
| 6,754,325 B1 | 6/2004 | Silver et al. |

(Continued)

OTHER PUBLICATIONS www.carrollcommunications.com/ipoffice/5donotdisturb.html, p. 1 of 2.

(Continued)

*Primary Examiner* — William Deane, Jr.

(57) ABSTRACT

Embodiments of the present invention are directed to a method and system for identifying a first dialog between an element and a server and a second dialog between the server and a first device, wherein the first dialog and second dialog are connected to form an active call, identifying a call park request code from the first device through a third dialog between the first device and the server, creating a fourth dialog between the server and a parking address based on the call park request code, disconnecting the first dialog and second dialog, connecting the first dialog with the fourth dialog to park the active call, identifying a call pickup request code from a second device through a fifth dialog between the second device and the server, disconnecting the first dialog and the fourth dialog, and connecting the first dialog with the fifth dialog to resume the active call.

20 Claims, 7 Drawing Sheets

U.S. PATENT DOCUMENTS

| | | | |
|---|---|---|---|
| 6,801,604 B2 | 10/2004 | Maes et al. | |
| 6,807,259 B1 | 10/2004 | Patel et al. | |
| 6,834,048 B1 | 12/2004 | Cho et al. | |
| 6,856,616 B1 | 2/2005 | Schuster et al. | |
| 6,857,072 B1 | 2/2005 | Schuster et al. | |
| 6,870,830 B1 | 3/2005 | Schuster et al. | |
| 6,876,632 B1 | 4/2005 | Takeda | |
| 6,879,673 B2 | 4/2005 | Creamer et al. | |
| 6,954,521 B2 | 10/2005 | Bull et al. | |
| 6,954,524 B2 | 10/2005 | Gibson | |
| 6,961,332 B1 | 11/2005 | Li et al. | |
| 6,963,633 B1 | 11/2005 | Diede et al. | |
| 6,965,614 B1 | 11/2005 | Osterhout et al. | |
| 6,985,961 B1 | 1/2006 | Ramsayer et al. | |
| 6,996,605 B2 | 2/2006 | Low et al. | |
| 7,020,130 B2 | 3/2006 | Krause et al. | |
| 7,031,700 B1 * | 4/2006 | Weaver et al. | 455/420 |
| 7,039,710 B2 | 5/2006 | Khartabil | |
| 7,050,559 B2 | 5/2006 | Silver et al. | |
| 7,082,193 B2 | 7/2006 | Barclay et al. | |
| 7,085,253 B2 | 8/2006 | Yang | |
| 7,130,282 B2 | 10/2006 | Black | |
| 7,145,997 B2 | 12/2006 | Poikselka et al. | |
| 7,203,293 B1 | 4/2007 | Bedingfield | |
| 7,224,792 B2 | 5/2007 | Fusco | |
| 7,257,837 B2 | 8/2007 | Xu et al. | |
| 7,260,201 B2 | 8/2007 | Jorasch et al. | |
| 7,274,662 B1 | 9/2007 | Kalmane et al. | |
| 7,283,517 B2 | 10/2007 | Yan et al. | |
| 7,290,288 B2 | 10/2007 | Gregg et al. | |
| 7,295,577 B2 | 11/2007 | Moody et al. | |
| 7,301,913 B2 | 11/2007 | Corrao et al. | |
| 7,406,696 B2 | 7/2008 | Burger et al. | |
| 7,426,265 B2 | 9/2008 | Chen et al. | |
| 7,440,440 B1 * | 10/2008 | Abichandani et al. | 370/351 |
| 7,460,657 B1 | 12/2008 | Baeza | |
| 7,489,771 B2 * | 2/2009 | McMurry et al. | 379/201.01 |
| 7,580,497 B2 | 8/2009 | Wang et al. | |
| 7,593,389 B2 | 9/2009 | Vance | |
| 7,599,355 B2 | 10/2009 | Sunstrum | |
| 7,609,700 B1 | 10/2009 | Ying et al. | |
| 7,609,706 B2 | 10/2009 | Scott et al. | |
| 7,630,481 B2 | 12/2009 | Kafka | |
| 7,715,413 B2 | 5/2010 | Vaziri et al. | |
| 7,743,141 B2 | 6/2010 | Wang et al. | |
| 7,773,581 B2 | 8/2010 | Punj et al. | |
| 7,860,089 B2 * | 12/2010 | Tripathi et al. | 370/389 |
| 8,059,805 B2 | 11/2011 | Claudatos et al. | |
| 8,116,302 B1 | 2/2012 | Robbins | |
| 2002/0038388 A1 | 3/2002 | Netter | |
| 2002/0114318 A1 | 8/2002 | Rines | |
| 2002/0131447 A1 | 9/2002 | Krishnamurthy et al. | |
| 2002/0136359 A1 | 9/2002 | Stumer et al. | |
| 2002/0136363 A1 | 9/2002 | Stumer et al. | |
| 2002/0137495 A1 | 9/2002 | Gabrysch | |
| 2002/0141548 A1 | 10/2002 | Boda | |
| 2002/0156900 A1 | 10/2002 | Marquette et al. | |
| 2003/0028806 A1 | 2/2003 | Govindarajan et al. | |
| 2003/0043992 A1 | 3/2003 | Wengrovitz | |
| 2003/0088421 A1 | 5/2003 | Maes et al. | |
| 2003/0231759 A1 | 12/2003 | Bedingfield, Sr. et al. | |
| 2004/0030750 A1 | 2/2004 | Moore et al. | |
| 2004/0037403 A1 | 2/2004 | Koch | |
| 2004/0051900 A1 | 3/2004 | Sagiya et al. | |
| 2004/0082324 A1 | 4/2004 | Ayoub | |
| 2004/0090954 A1 | 5/2004 | Zhang et al. | |
| 2004/0148395 A1 * | 7/2004 | Schulzrinne | 709/227 |
| 2004/0207724 A1 | 10/2004 | Crouch et al. | |
| 2004/0240656 A1 * | 12/2004 | Poustchi | 379/220.01 |
| 2004/0243680 A1 | 12/2004 | Mayer | |
| 2004/0249951 A1 | 12/2004 | Grabelsky et al. | |
| 2004/0264406 A1 | 12/2004 | Pattenden et al. | |
| 2005/0013421 A1 | 1/2005 | Chavez et al. | |
| 2005/0043014 A1 | 2/2005 | Hodge | |
| 2005/0069104 A1 | 3/2005 | Hanson et al. | |
| 2005/0078642 A1 | 4/2005 | Mayer et al. | |
| 2005/0123104 A1 | 6/2005 | Bishop et al. | |
| 2005/0129219 A1 | 6/2005 | Williamson | |
| 2005/0147227 A1 * | 7/2005 | Chervirala et al. | 379/215.01 |
| 2005/0190721 A1 | 9/2005 | Pershan | |
| 2005/0193338 A1 | 9/2005 | Hawkins et al. | |
| 2005/0195802 A1 | 9/2005 | Klein et al. | |
| 2005/0201530 A1 | 9/2005 | Koch et al. | |
| 2005/0213716 A1 | 9/2005 | Zhu et al. | |
| 2005/0215243 A1 | 9/2005 | Black et al. | |
| 2005/0226217 A1 | 10/2005 | Logemann et al. | |
| 2005/0237978 A1 | 10/2005 | Segal | |
| 2005/0249196 A1 | 11/2005 | Ansari et al. | |
| 2005/0286466 A1 | 12/2005 | Tagg et al. | |
| 2006/0033809 A1 | 2/2006 | Farley | |
| 2006/0039389 A1 | 2/2006 | Burger et al. | |
| 2006/0062210 A1 | 3/2006 | Dharanikota | |
| 2006/0062251 A1 | 3/2006 | Lim et al. | |
| 2006/0067300 A1 | 3/2006 | Poustchi et al. | |
| 2006/0067504 A1 | 3/2006 | Goldman et al. | |
| 2006/0140379 A1 | 6/2006 | Yamamoto et al. | |
| 2006/0140380 A1 | 6/2006 | Croak et al. | |
| 2006/0146737 A1 | 7/2006 | Sandgren et al. | |
| 2006/0165060 A1 | 7/2006 | Dua | |
| 2006/0177030 A1 | 8/2006 | Rajagopalan et al. | |
| 2006/0177044 A1 | 8/2006 | O'Neil et al. | |
| 2006/0178130 A1 | 8/2006 | Makrygiannis | |
| 2006/0203986 A1 | 9/2006 | Gibson | |
| 2006/0218283 A1 | 9/2006 | Jones | |
| 2006/0221176 A1 | 10/2006 | Di Pietro et al. | |
| 2006/0251229 A1 | 11/2006 | Gorti et al. | |
| 2006/0285533 A1 | 12/2006 | Divine et al. | |
| 2006/0286984 A1 | 12/2006 | Bonner | |
| 2007/0025270 A1 | 2/2007 | Sylvain | |
| 2007/0058613 A1 | 3/2007 | Beckemeyer | |
| 2007/0083658 A1 | 4/2007 | Hanna et al. | |
| 2007/0092073 A1 | 4/2007 | Olshansky et al. | |
| 2007/0111723 A1 | 5/2007 | Ahmed et al. | |
| 2007/0143858 A1 | 6/2007 | Hearty | |
| 2007/0280469 A1 | 12/2007 | Baker et al. | |
| 2008/0049724 A1 * | 2/2008 | Tsujino et al. | 370/352 |
| 2008/0126549 A1 | 5/2008 | Khanchandani et al. | |

OTHER PUBLICATIONS www.cisco.com/en/U/s/products/sw/voicesw/ps556/products_administration_guide, pp. 3-5 of 26.

Rosenberg et al. "RFC 3261, SIP: Session Initiation Protocol", The Internet Society, Jun. 2002.

Newton's Telecom Dictionary 22nd Edition, p. 829, Feb. 2006.

Sparks, "RFC 3515—The Session Initiation Protocol (SIP) Refer Method," The Internet Society, Apr. 2003.

Mahy et al., "RFC 3891—The Session Initiation Protocol (SIP) 'Replaces' Header," The Internet Society, Sep. 2004.

Mahy et al, "RFC 3911—The Session Initiation Protocol (SIP) 'Join' Header," The Internet Society, Oct. 2004.

Handley et al., "RFC 2327—SDP: Session Description Protocol," The Internet Society, Apr. 1998.

Schulzrinne et al., "RFC 1889—RTP: A Transport Protocol for Real-Time Applications," The Internet Society, Jan. 1996.

Schulzrinne et al., "RFC 2833—RTP Payload for DTMF Digits, Telephony Tones and Telephony Signals," The Internet Society, May 2000.

Mahy et al., "draft-ietf-sip-join-03—The Session Initiation Protocol (SIP) "Join" Header," The Internet Society, Feb. 2004.

Mahy et al.,"draft-ietf-sipping-cc-framework-03—A Call Control and Multi-party usage framework for the Session Initiation Protocol (SIP)," The Internet Society, Oct. 27, 2003.

Rosenberg, "RFC 3311—The Session Initiation Protocol (SIP) UPDATE Method," The Internet Society, Sep. 2002.

Rosenberg et al., "RFC 3262—Reliability of Provisional Responses in the Session Initiation Protocol (SIP)," The Internet Society, Jun. 2002.

Jennings et al., "RFC 3325—Private Extensions to the Session Initiation Protocol (SIP) for Asserted Identity within Trusted Networks," The Internet Society, Nov. 2002.

Harrington et al., "RFC 3411—An Architecture for Describing Simple Network Management Protocol (SNMP) Management Frameworks," The Internet Society, Dec. 2002.

Rosenberg et al., "RFC 3840—Indicating User Agent Capabilities in the Session Initiation Protocol (SIP)," The Internet Society, Aug. 2004.

Mahy, "RFC 3842—A Message Summary and Message Waiting Indication Event Package for the Session Initiation Protocol (SIP)," The Internet Society, Aug. 2004.

"SR-504: SPCS Capabilities and Features," Telcordia Technologies, Issue 1, Mar. 1996.

"SR-3065: LSSGR Guide," Telcordia Technologies, Issue 7, Aug. 2003.

Mahy et al., "draft-ietf-sip-replaces-05—The Session Initiation Protocol (SIP) "Replaces" Header," The Internet Society, Feb. 16, 2004.

Schulzrinne, "draft-ietf-sipping-sos-00—Emergency Services URI for the Session Initiation Protocol," The Internet Society, Feb. 8, 2004.

Rosenberg et al., "draft-ietf-sipping-dialog-package-04—An INVITE Initiated Dialog Event Package for the Session Initiation Protocol (SIP)," The Internet Society, Feb. 13, 2004.

Lingle et al., "draft-ietf-sip-mib-08—Management Information Base for Session Initiation Protocol (SIP)," The Internet Society, Jul. 16, 2004.

Johnston et al., "draft-ietf-sipping-cc-conferencing-04—Session Initiation Protocol Call Control—Conferencing for User Agents," The Internet Society, Jul. 18, 2004.

Sparks et al., "draft-ietf-sipping-cc-transfer-02—Session Initiation Protocol Call Control—Transfer," The Internet Society, Feb. 15, 2004.

Rosenberg et al., "draft-ietf-sipping-conference-package-04—A Session Initiation Protocol (SIP) Event Package for Conference State," The Internet Society, May 21, 2004.

Petrie, "draft-ietf-sipping-config-framework-04—A Framework for Session Initiation Protocol User Agent Profile Delivery," The Internet Society.

"GR-1298-Core—AINGR: Switching Systems," Telcordia Technologies, Issue 6, Nov. 2000.

* cited by examiner

METHOD AND SYSTEM FOR PROVIDING CALL PARKING IN A SIP-BASED NETWORK

CROSS-REFERENCE TO RELATED APPLICATIONS

This patent application claims priority to U.S. Provisional Patent Application No. 60/719,465, filed Sep. 22, 2005, which is hereby incorporated by reference herein in its entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and process of an exemplary embodiment of the present invention provides a SIP-based call parking service by replicating the behavior of call parking in a public switched telephone network (PSTN). An embodiment of the present invention allows a caller to put an active call in a "parked" state by performing a hook flash (e.g., a quick hang-up and pick-up or other action) followed by entering a parking code and an optional destination code. The parked call may be retrieved by going off-hook (e.g., picking up) and entering the parking code and destination code (if one was entered). In one embodiment of the present invention, a notification signal (e.g., a ring, etc.) may be provided if the parked call remains parked for an extended duration of time.

Figure 1:
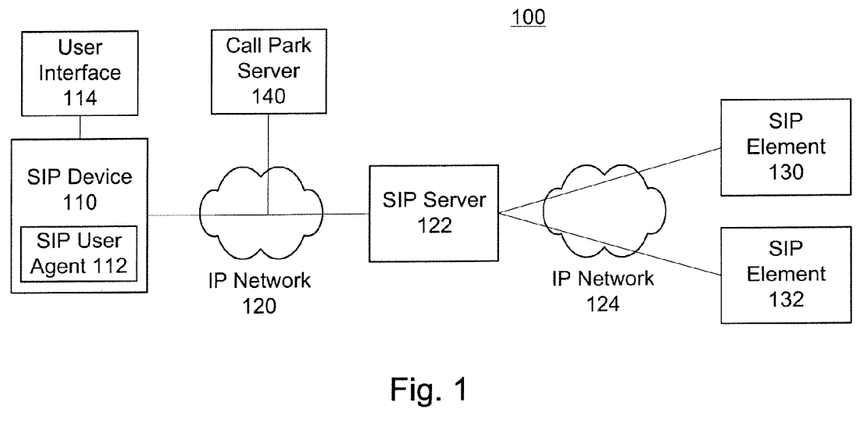
FIG. 1 is an exemplary SIP-based network system, according to an embodiment of the present invention.

FIG. 1 is an exemplary SIP-based network system, according to an embodiment of the present invention. System 100 illustrates an exemplary system for supporting SIP communication, in particular call parking. As illustrated, SIP Device 110 may be coupled to User Interface 114. SIP Device 110 may include a SIP User Agent 112 for communicating across IP Network 120 to a SIP Server 122. Call Park Server 140 may be provided to the IP network 120 to provide "parking spaces" for calls. SIP Server 122 may provide communication to other SIP devices, as shown by SIP Element 130 and SIP element 132, through IP Network 124. The various components of system 100 may be further duplicated, combined and/or integrated to support various applications and platforms. Additional elements may also be implemented in the system to support various applications. A SIP-based network may also include an IP network, packet switched based network, or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voiceband or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. SIP Element may be a SIP Device, SIP Server, and/or other SIP enabled device. In addition, SIP Element may also represent a PSTN device that may be reached by a gateway that, directly or indirectly, acts as a SIP User Agent.

In single-line devices, an emulated call parking process may be implemented by a SIP Server 122. In this example, the SIP Server 122 may manage and maintain most of the call parking functionalities. For more sophisticated or more capable devices, e.g., a multi-line telephone devices that can manage multiple simultaneous dialogs, a SIP User Agent 112 of a SIP Device 110 may play a greater role in managing the call parking features.

Figure 2:
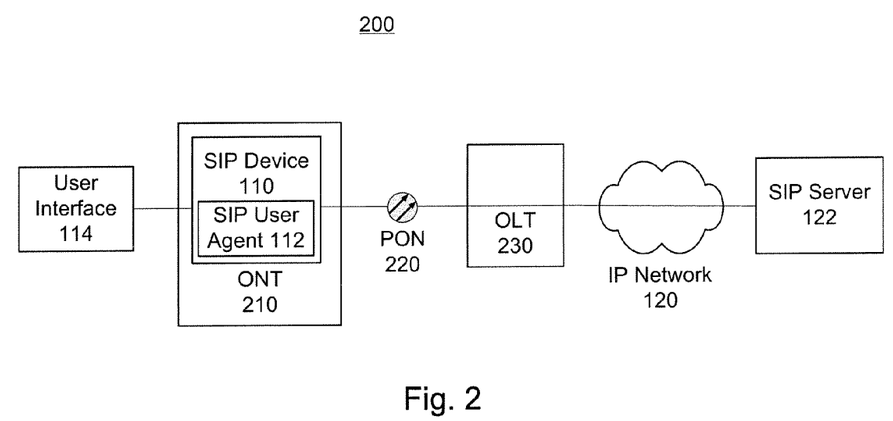
FIG. 2 illustrates an exemplary implementation where a SIP Device is embedded in a FTTP network, according to an embodiment of the present invention.
Figure 3:
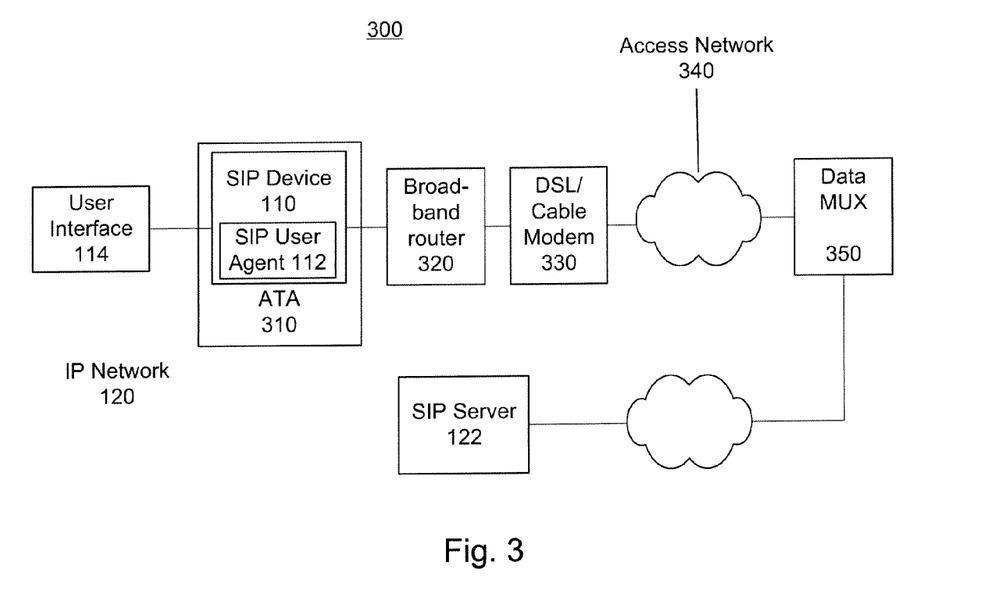
FIG. 3 illustrates an exemplary implementation where a SIP Device is embedded in an ATA device connected to an IP network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 via a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an transport IP connection between SIP Device 110 on the ONT 210 and the IP network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications.

The call parking service in PSTN may be considered a variation of a call transfer. In call parking, however, a call may be transferred to a "parking place" (or "parking address"). While a call transfer service provides a subscriber the opportunity to converse with the transfer target before completing the transfer, a call parking service may complete the transfer immediately. Furthermore, call parking may allow the subscriber to resume the parked call from the same device or from another device. The call may also be picked up by another subscriber altogether, where the subscriber knows or is capable of receiving the codes corresponding to the parked call. As a result, a call parking service may provide tremendous flexibility.

Figure 4:
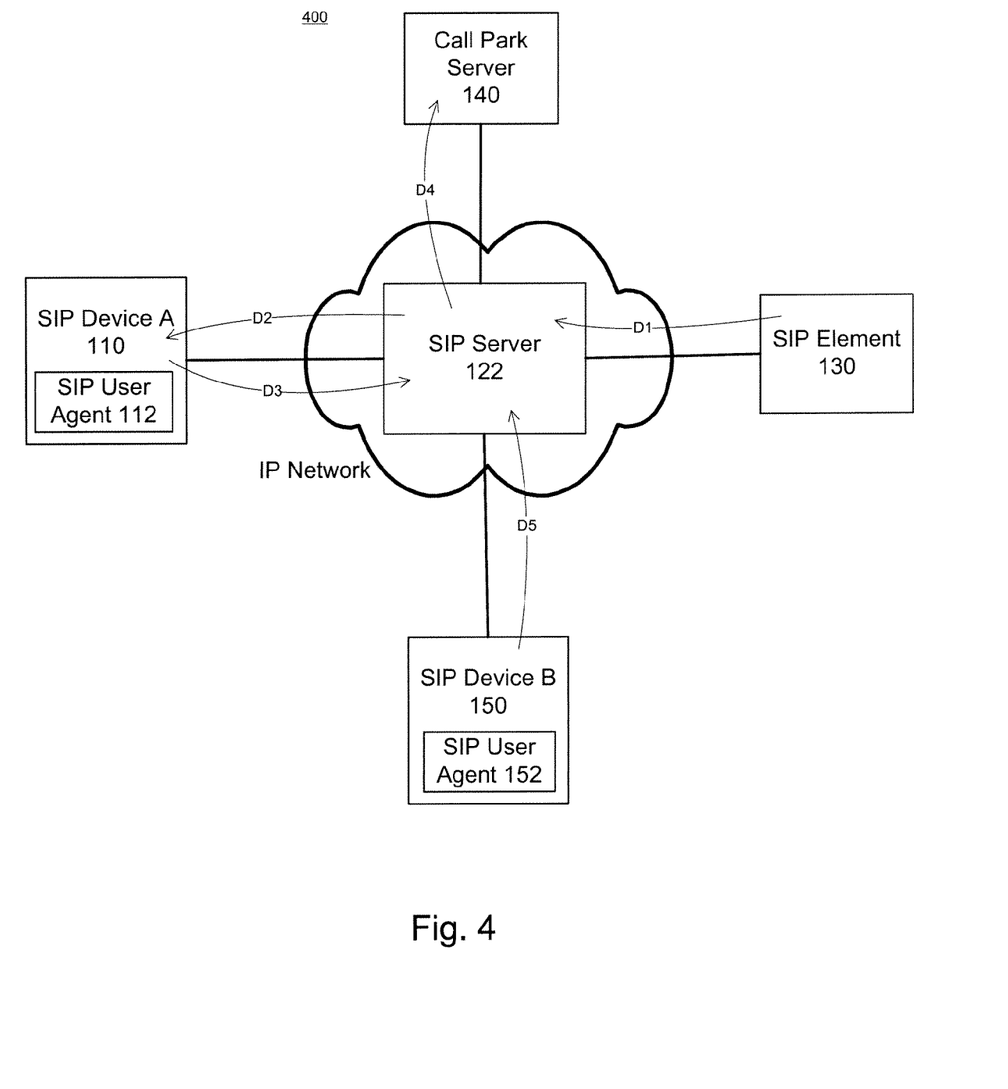
FIG. 4 depicts an exemplary implementation of dialog creation in a call parking process, according to an embodiment of the present invention.

FIG. 4 depicts an exemplary implementation illustrating the various dialogs involved in a call parking process, according to an embodiment of the present invention. In a call parking process for single-line devices 400, a plurality of dialogs may be created. In this exemplary application, five dialogs may be created. A first dialog D1 may be created between a SIP Element 130 and a SIP Server 122 over an IP network. In one embodiment, the first dialog D1 may be an attempt from a user at SIP Element 130 to establish an active call with a user at SIP Device A 110. In this example, a second dialog D2 may be created between the SIP Server 122 and a SIP Device A 110. When SIP Server 122 connects the first dialog D1 with the second dialog D2, an active call between users at SIP Element 130 and SIP Device A 110 may be established. The user at SIP Device A 110 may then desire to "park" the active call for possible later retrieval from a SIP Device B 150. In this process, additional dialogs may be created. A third dialog D3 may be established between the SIP Device A 110 and the SIP Server 122 in which the user at SIP Device A 110 is invoking the call park feature. A fourth dialog D4 may then be created between the SIP Server 122 and a parking address at Call Park Server 140. The SIP Server 122 may then disconnect the first dialog D1 from the second dialog D2 (which formed the active call) and connect the first dialog D1 with the fourth dialog D4 to effectively establish the "parked" call. The user may then use SIP Device B 150 to retrieve the parked call. A fifth dialog D5 may be created between the SIP Device B 150 and SIP Server 122 in which the user invokes the call park retrieval service. Once the SIP Server 122 identifies that the user is invoking the call park retrieval, it may disconnect the first dialog D1 from the fourth dialog D4 (which formed the parked call) and connect the fifth dialog D5 and the first dialog D1 to effectively complete the call park and retrieval operation. The steps involved in the creation, establishment, and termination of these dialogs will be discussed below in accordance with the call parking process of FIG. 5.

Figure 5:
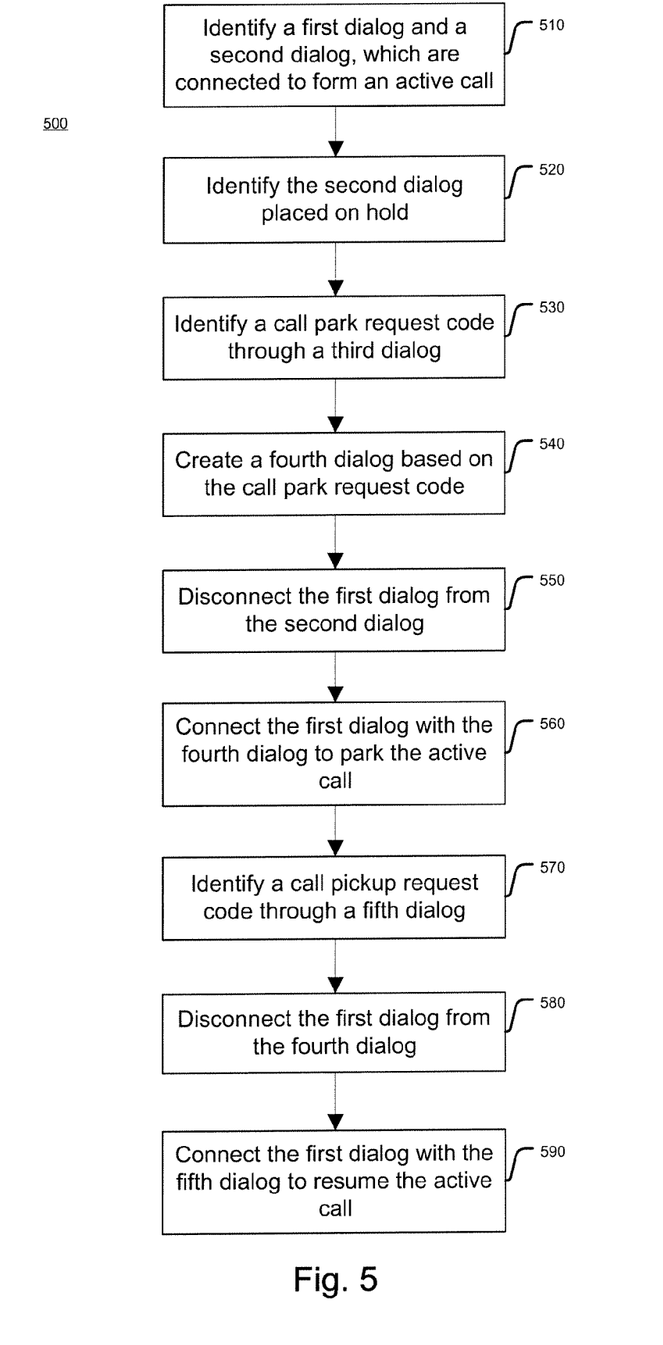
FIG. 5 depicts an exemplary flowchart illustrating a call parking process, according to an embodiment of the present invention.

FIG. 5 depicts an exemplary flowchart illustrating a method for a call parking process 500, according to an embodiment of the present invention. At step 510, an SIP server 122 may be configured to identify a first dialog D1 between a SIP element 130 and SIP server 122 and a second dialog D2 between the SIP server 122 and a first SIP device 110, wherein the first dialog D1 and second dialog D2 are connected to form an active call. At step 520, the SIP server 122 may identify the second dialog D2 when placed on hold. At step 530, the SIP server 122 may identify a call park request code from the first SIP device 110 through a third dialog D3 between the first SIP device 110 and the SIP server 122. At step 540, a fourth dialog may be created between the SIP server 122 and a parking address at the Call Park Server 140 based on the call park request code. At step 550, the first dialog D1 may be disconnected from the second dialog D2. At step 560, the SIP Server 122 may connect the first dialog D1 with the fourth dialog D4 to effectively "park" the active call. At step 570, the SIP Server 122 may identify a call pickup request code from a second SIP device 150 through a fifth dialog D5 between the second SIP device 150 and the SIP server 122. At step 580, the first dialog D1 and the fourth dialog D4 may be disconnected from each other to "unpack" the call. At step 590, the first dialog D1 may be reconnected with the fifth dialog D5 to resume the active call and complete the call park and call retrieval operation.

At step 510, a SIP server 122 may be configured to identify an active call. In one embodiment of the present invention, an active call may include an SIP server connecting a first dialog D1 and a second dialog D2. In this example, a user at a SIP element 130 who calls a user at a first SIP Device (or SIP device A) 110 may transmit an INVITE message to a SIP Server 122. In one embodiment of the present invention, a SIP server 122 may include a packet switched network server. Once the SIP server receives and accepts the INVITE message, a first dialog D1 may be established between a SIP element 130 and the SIP server 122. As a result, SIP Server 122 may send an INVITE message to the first SIP Device 110

(target party). When the first SIP Device 110 receives and accepts this INVITE message from the SIP Server 122, a second dialog D2 may be created. Thus, an active call is established (and identified) by the SIP server 122 when the first dialog D1 is connected to the second dialog D2. As a result, the users and parties involved in the call may talk, converse, or share other types of information.

During the call, a user may decide to "park" the call. For example, the user at the first SIP device 110 may desire to park the call and resume the call at a second SIP device 150. In this example, the user may place the second dialog D2 on hold by performing a hook flash or other action.

At step 520, the SIP server 122 may identify the second dialog D2 when placed on hold. When a the second dialog D2 is successfully placed on hold, the user may receive and hear a dial tone to indicate that the active call has been placed on hold. Alternatively, first SIP device 110 may process the hold of the second dialog and provide dial tone to indicate the hold has taken place. Other various embodiments may also be provided.

At step 530, a user may dial a call park request code, e.g., a vertical service code (VSC), other predetermined alphanumeric combination, or other identifier, to invoke the call parking feature. In addition, the use may perform an action (e.g., voice a command, etc.) to invoke the feature. In one embodiment, first SIP device 110 may send an INVITE message to SIP server 122 along with the call park request code. The SIP server 122 may receive and accept the INVITE message and create a third dialog D3 with first SIP device 110. In addition, the SIP Server 122 may also identify the call park request code from first SIP device 110. In one embodiment of the present invention, the call park request code may include a parking address code. The parking address code may include a predetermined alphanumeric combination or other identifier that maps to a specific parking "space" for the held dialog to be parked. In this example, there may be a multitude of parking spaces available at the Call Park Server 140. Thus, when a user or subscriber enters the specific call park request code and the parking address code, a call may be parked at a parking space corresponding to the parking address code. Other various implementations may also be considered.

At this point, the SIP server 122 may transmit an INVITE message to the Call Park Server 140. Once the INVITE message is received and accepted, the fourth dialog D4 is created, as depicted in step 540. At step 550, the SIP server 122 may disconnect the first dialog D1 from the second dialog D2. At step 560, the SIP server 122 may reconnect first dialog D1 to the fourth dialog D4. This connection effectively "parks" the active call. In one embodiment, an audio session may be established between the SIP element 130 and the Call Park Server 140 such that the user at the SIP element 130 may hear music or other sounds indicating that the active call is parked. The second dialog D2 may be terminated.

A user, after parking the call in a designated parking place, may seek to resume the call from a second SIP device (SIP Device B) 150. The second SW device 150 may in fact be the same as the first SIP device 110, but in another embodiment the second SIP device 150 may be different from the first SIP device 110. At step 570, the SIP Server 122 may establish and identify a fifth dialog D5 with the second SIP device 150 once it receives and accepts an INVITE message, along with the call pickup request code and parking address code (if one was previously entered), from the second SIP device 150. In the case where a parking address code was never or improperly entered, the entry of the call park request code may be sufficient for the SIP Server 122 accept the INVITE message and create the fifth dialog D5. In one embodiment, the call pickup request code may be the same as the call park request code. In another embodiment, the call pickup request code may be different from the call park request code. Other various embodiments may also be implemented.

Once the fifth dialog D5 is created, the SIP server 122 may disconnect the first dialog D1 from the fourth dialog D4, as depicted in step 580, to "unpark" the call. At step 590, the SIP server 122 may reconnect the first dialog D1 with the fifth dialog D5 and the user at the second SIP device 150 may resume the active call with a party at the SIP element 130.

In an embodiment of the present invention, a notification may be provided by the SIP Server 122 to at least one SIP device 110 when a parked call is not retrieved for a predetermined period of time. In this example, a SIP device 110 may notify a user, for example, by a ringing signal, based on certain conditions. For example, the user may be notified if a call pickup request code is not identified at the second device within a predetermined time period. In addition, the user may be notified if the SIP server does not identify a new user dialog within a predetermined period of time. In another embodiment, a parked call may be sent back to the SIP device 110 that originally parked the call. In this example, the SIP device may provide a notification, e.g., a distinctive ringing pattern, with an expectation that a user answer the call. This ringing may continue until the parked call is retrieved. Alternatively, the notification may end after a predetermined period of time has passed. In this case, the parked call may remain parked if the device does not go off-hook. Other notifications and ringing patterns may also be considered, e.g., a "splash ring," etc. A "splash ring" may be a single brief burst of ringing that is performed at a device, such as a telephone. In a SIP signaling, a SIP device that wishes to be notified may include subscribing to a relevant event at a server, receiving a NOTIFY message, and performing the splash ring. In yet another embodiment, a parked call may remain parked indefinitely (if it is never retrieved) with no notification of any type. Other conditions may be applied. Other various embodiments may also be considered.

In another embodiment of the present invention, a call parking service may be implemented for other devices. Such devices may include multi-line telephones that are capable of managing simultaneous multiple dialogs. In this example, a SIP User Agent 112 of a SIP Device 110 may perform a call parking service where the User Agent 112 of a SIP device 110 may be in a unique position to associate with the services of a particular dialog more easily.

Figure 6:
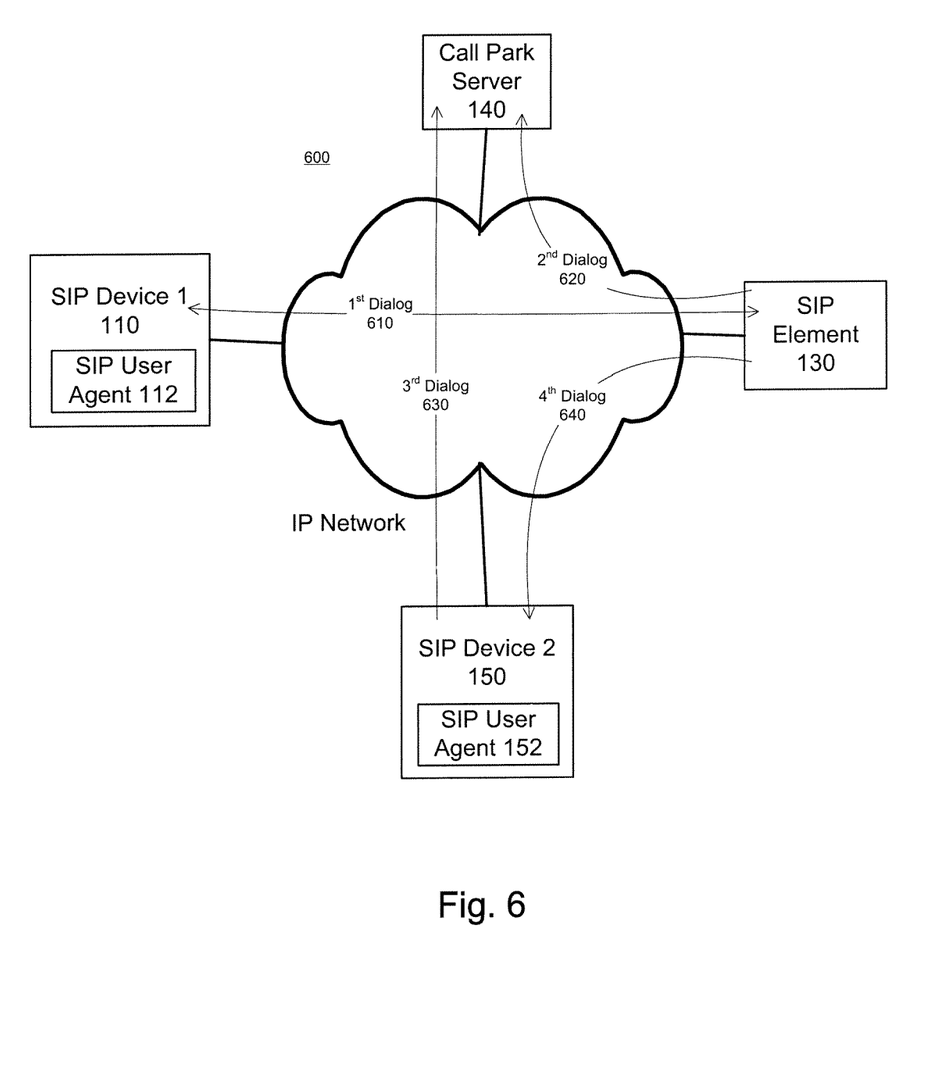
FIG. 6 depicts an exemplary implementation of dialog creation in a call parking process, according to an embodiment of the present invention.

FIG. 6 depicts an exemplary implementation illustrating the various dialogs involved in a call parking process, according to an embodiment of the present invention. In a call parking process 600 for multi-dialog capable devices, a plurality of dialogs may be created. In this exemplary application, four dialogs may be created. A first dialog 610 may be created between a first SIP device 110 and an SIP Element 130. In one embodiment, this dialog 610 may be an active call between a user at a first SIP device 110 and another user at a SIP element 130 that is to be "parked." A second dialog 620 may be established between the SIP Element 130 and a parking address at the Call Park Server 140. The second dialog 620 may be analogous to the held dialog in a single-line call parking service in the "parked" position, as discussed above. A third dialog 630 may be created between the parking address at the Call Park Server 140 and a second SIP device 150. In one embodiment of the present invention, the second SIP device 150 may be different from the first SIP device 110. In another embodiment, the second SIP device 150 may be the same as the first SIP device 110. A fourth dialog 640 may be established between the SIP Element 130 and the second SIP device 150 to effectively resume the call. The steps involved in the creation, establishment, and termination of these dialogs will be discussed below in accordance with the call parking process of FIG. 7.

Figure 7:
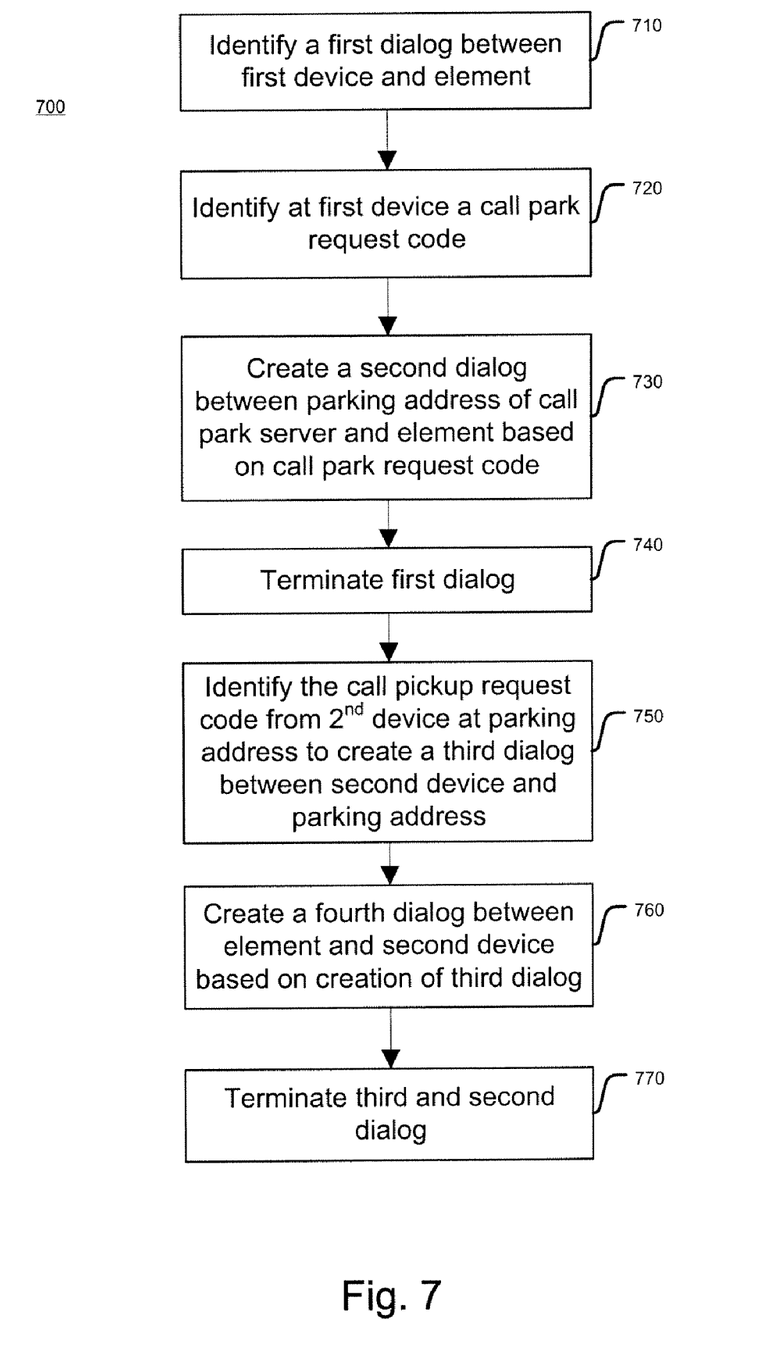
FIG. 7 depicts and exemplary flowchart illustrating a call parking process, according to an embodiment of the present invention.

FIG. 7 depicts and exemplary flowchart illustrating a call parking process, according to an embodiment of the present invention. At step 710, a first SIP device 110 may identify a first dialog 610 between the first SIP device 110 and a SIP element 130 (associated with a call between first SIP device 110 and SIP element 130). At step 720, the first SIP device 110 may identify a call park request code. At step 730, a second dialog 620 may be created between a parking address at a Call Park Server 140 and the SIP Element 130 (thus parking the call at the Call Park Server). At step 640, the first dialog 610 may be terminated. At step 750, the parking address of the Call Park Server 140 may identify the call park request code and/or parking address from a second SIP device 150 and create a third dialog 630 between the second SIP device 150 and the parking address. At step 760, a fourth dialog 640 may be established between the SIP element 130 and the second SIP device 150 thus allowing the call to continue. At step 770, the third and second dialogs 630, 620 may be terminated.

At step 710, the SIP User Agent 112 of a first SIP device 110 may identify a first dialog 610 between a first SIP device 110 and a SIP element 130 when a user performs a hook flash, for example, to place the first dialog 610 on hold. In this example, the first dialog 610 may be an active call. Also, the first dialog 610 may also be between at least two SIP devices or at least one SIP device 110 and at least one SIP element 130. Other various embodiments may also be provided. When the first dialog 610 is successfully placed on hold, the user may hear a dial tone at first SIP device 110 or observe another indicator.

At step 720, the SIP User Agent 112 of the first SIP device 110 may identify a call park request code. Similar to single-line call parking, a call park request code in a multi-line device may include, for example, a VSC, other predetermined alphanumeric combination, or other indicator or code. In an embodiment of the present invention, the call park request code may also include a parking address code. The parking address code may include predetermined alphanumeric combination or other code that indicates a specific "parking space" for the first dialog 610. Alternatively, a parking address code may be automatically assigned (e.g. equal to the phone number of the parking party). In this example, the Call Park Server 140 may provide a number of "locations" or "parking spaces" for held calls. The parking address code may be mapped to a parking address at the Call Park Server. Other implementations may also be considered.

The first SIP Device 110 may transmit a REFER request to the parking address, such as Parking Place P, with parameters specifying that an INVITE message is to be sent to the SIP Element 130. In this example, the INVITE message may include a header specifying that a second dialog 620 replace the first dialog 610. Parking Place P may then send the INVITE message to the SIP Element 130 as well as a NOTIFY message for the implicit REFER subscription to the first SIP device 110. In one embodiment, the body of the NOTIFY message may contain a response code, e.g., a "100" response code.

At step 730, the SIP Element 130 may accept the INVITE message from the parking address. When the INVITE message is accepted, a second dialog 620 may be established when a response code, e.g., a "200" response, is received at Parking Place P. The SIP element 130 may also send a BYE request to the first SIP device 110 to terminate the first dialog 610, as depicted in step 740. Once the first SIP Device 110 receives from Parking Place P a NOTIFY message containing the response code, e.g., the "200" response code, the "park" operation of the active call may be effectively achieved.

At this point, the parked call may be picked up the user who parked the call or by any authorized user. An authorized user may include a user who has the call park request code information, a user capable of receiving that information, or other authorized user. To retrieve the parked call, the user of the first SIP device 110 may perform an action to request that the call with the SIP Element 130 parked at Parking Place P be picked up. The action performed may include making a second SIP device 150 to go off-hook and provides the call park request code and/or parking address code. Other various actions may also be considered. In one embodiment of the present invention, the second SIP device 150 may be different from the first SIP device 110. In another embodiment, the second SIP device 150 may be the same as the first SIP device 110.

Once the second SIP device 150 goes off-hook, the second SIP device 150 may send an INVITE message to Parking Place P, as depicted in step 750. When Parking Place P accepts the INVITE message, a third dialog 630 may be established between the second SIP device 150 and the parking address. Parking Place P may then send a REFER message to the SIP Element 130, where the parameters specify that an INVITE message be sent to the second SIP device 150. In an embodiment of the present invention, the INVITE message may include a header specifying that a fourth dialog 640 replace the third dialog 630.

At step 760, the SIP Element 130 may transmit the INVITE message to the second SIP Device 150 as well as a NOTIFY message for the implicit REFER subscription to Parking Place P. In one embodiment of the present invention, the body of the NOTIFY message may contain a response code, such as a "100" response code. Once the second SIP Device 150 accepts the INVITE message, a fourth dialog 640 may be established when the second SIP device 150 sends a response (e.g., a "200" response) to the SIP Element 130.

At step 770, when the fourth dialog 640 is created, Parking Place P may receive a BYE request from the second SIP device 150 to terminate the third dialog 630. SIP Element 130 may then send a NOTIFY message containing a "200" response code to Parking Place P. Once Parking Place P receives the NOTIFY message and sends a BYE request to the SIP Element 130, the second dialog 620 may be terminated. The fourth dialog 640, which is the only dialog not yet terminated, may effectively become the "unparked" call, from which the user and at least another party may resume dialog to complete the call park retrieval process.

The emulation of the call parking process as disclosed above may be advantageous for several reasons. An embodiment of the present invention may assign a well-known identity (implicit or explicit) to the parking place. As a result, the parked dialog or call may have a distinct parking place identity. Furthermore, an embodiment of the present invention may pick up parked calls by sending a request or message to the parking address, which in turn may transfer the parked call to the user requesting to resume the parked call. These distinct features may work together to make the various embodiments of the present invention a significantly better match to the familiar call park behavior as seen in the PSTN. In addition, an embodiment of the present invention may provide a simpler implementation for a SIP device to replicate the PSTN call park behavior. Other various embodiments for enhancing the call parking service may also be considered.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
    identifying, by a server, a first dialog between a network element and the server and a second dialog between the server and a first device, wherein the first device and network element are Session Initiation Protocol (SIP) devices and wherein the first dialog and second dialog are connected to form an active SIP-based call;
    identifying, by the server, a call park request code from the first device through a third dialog between the first device and the server;
    initiating, by the server, a fourth dialog between the server and a parking address based on the call park request code;
    disconnecting, by the server, the first dialog and second dialog; and
    connecting the first dialog with the fourth dialog to park the active SIP-based call.

2. The method of claim 1, wherein the method further comprises:
    terminating, by the server, the second dialog and the third dialog.

3. The method of claim 2, wherein terminating, by the server, the third dialog comprises initially transmitting to the first device a notification to confirm that the first dialog and fourth dialog are connected.

4. The method of claim 1, wherein the method further comprises:
    identifying, by the server, a call pickup request code from a second device through a fifth dialog between the second device and the server, wherein the second device is a SIP device;
    disconnecting, by the server, the first dialog and the fourth dialog; and
    connecting the, by the server, first dialog with the fifth dialog to resume the active SIP-based call.

5. The method of claim 1, wherein the method further comprises terminating, by the server, the fourth dialog.

6. The method of claim 1, wherein identifying, by the server, a call park request code further comprises identifying a parking destination code that corresponds to the parking address.

7. The method of claim 1, wherein identifying a call pickup request code further comprises identifying a parking destination code that corresponds to the parking address.

8. The method of claim 1, wherein the method further comprises:
    notifying, by the server, the at least one device when the call pickup request code is not identified at the second device within a predetermined time period.

9. The method of claim 8, wherein the at least one device comprises at least the first device.

10. The method of claim 1, wherein the server comprises a packet switched network server.

11. The method of claim 4, wherein the second device is different from the first device.

12. The method of claim 4, wherein the second device is the same as the first device.

13. A non-transitory computer readable medium comprising code which when executed causes a computer to perform the method of claim 1.

14. A system, comprising:
    a server configured to identify a first dialog between a network element and a server and a second dialog between the server and a first device, wherein the first device and network element are Session Initiation Protocol (SIP) devices and wherein the first dialog and second dialog are connected to form an active SIP-based call; identify a call park request code from the first device through a third dialog between the first device and the server; initiate a fourth dialog between the server and a parking address based on the call park request code; disconnect the first dialog and second dialog; connecting the first dialog with the fourth dialog to park the active call; terminate the second dialog and the third dialog; identify a call pickup request code from a second device through a fifth dialog between the second device and the server; disconnect the first dialog and the fourth dialog; connect the first dialog with the fifth dialog to resume the active SIP-based call; and terminate the fourth dialog.

15. A method, comprising:
    identifying, by a server, at a first dialog between a first device and a network element;
    identifying, by the server, a call park request code;
    initiating, by the server, a second dialog between a parking address at a call park server and the network element;
    terminating, by the server, the first dialog; and
    identifying, by the server, the call pickup request code from a second device at the parking address of the call park server to create a third dialog between the second device and the parking address,
    wherein the first device, second device, and network element are Session Initiation Protocol (SIP) devices.

16. The method of claim 15, wherein the method further comprises:
    creating, by the server, a fourth dialog between the network element and the second device.

17. The method of claim 16, wherein the method further comprises:
    terminating, by the server, the third and second dialog.

18. The method of claim 15, wherein identifying, by the server, each of the call park request code and the call pickup request code further comprises identifying a parking destination code that corresponds to the parking address.

19. The method of claim 15, wherein the method further comprises:
    notifying, by the server, the at least one device when the call pickup request code is not identified at the second device within a predetermined time period.

20. A non-transitory computer readable medium comprising code which when executed causes a computer to perform the method of claim 15.

* * * * *